(12) United States Patent
Arikapudi et al.

(10) Patent No.: US 12,481,684 B2
(45) Date of Patent: Nov. 25, 2025

(54) AUTOMATED COMPLETION OF QUESTIONNAIRES BASED ON UNSTRUCTURED DATABASE OBJECTS

(71) Applicant: Snowflake Inc., Bozeman, MT (US)

(72) Inventors: Abhiram Arikapudi, Sammamish, WA (US); Joshua W. McKibben, Felton, CA (US); Lucas A. Reber, Poulsbo, WA (US); Saurin Shah, Kirkland, WA (US)

(73) Assignee: Snowflake Inc., Bozeman, MT (US)

( * ) Notice: Subject to any disclaimer, the term of this patent is extended or adjusted under 35 U.S.C. 154(b) by 23 days.

(21) Appl. No.: 18/173,169

(22) Filed: Feb. 23, 2023

(65) Prior Publication Data
US 2024/0202220 A1   Jun. 20, 2024

Related U.S. Application Data

(60) Provisional application No. 63/387,878, filed on Dec. 16, 2022.

(51) Int. Cl.
*G06F 16/3329* (2025.01)
*G06F 16/332* (2019.01)

(52) U.S. Cl.
CPC ...... *G06F 16/3329* (2019.01); *G06F 16/3322* (2019.01)

(58) Field of Classification Search
CPC .......... G06F 16/3329; G06F 16/3322
See application file for complete search history.

(56) References Cited

U.S. PATENT DOCUMENTS

| | | |
|---|---|---|
| 10,592,675 B2 | 3/2020 | Dotson et al. |
| 11,610,213 B2 | 3/2023 | Rodriguez et al. |
| 2006/0036527 A1* | 2/2006 | Tinnirello .............. G06Q 40/08 705/35 |
| 2020/0090197 A1* | 3/2020 | Rodriguez ............. G06N 3/045 |

* cited by examiner

*Primary Examiner* — Tyler J Torgrimson
(74) *Attorney, Agent, or Firm* — Schwegman Lundberg & Woessner, P.A.

(57) ABSTRACT

Questionnaire completion systems and methodologies for a data platform. The data platform receives from a consumer an unstructured questionnaire to be completed based on structured database objects, semi-structured database objects, and unstructured database objects stored on the data platform by a provider. The data platform generates a secured completion of the unstructured questionnaire based on a questionnaire completion model and the unstructured questionnaire. The data platform determines a confidence score for the completion and in response to determining the confidence score does not exceed a threshold value, the data platform generates a structured query based on the unstructured questionnaire and a structured query model, and generates the secured completion based on querying the structured database objects using the structured query. The data platform applies a security function to the secured completion to generate a completion of the unstructured questionnaire and provides the completion to the consumer.

24 Claims, 9 Drawing Sheets

AUTOMATED COMPLETION OF QUESTIONNAIRES BASED ON UNSTRUCTURED DATABASE OBJECTS

PRIORITY CLAIM

This application claims the benefit of priority to U.S. Provisional Patent Application Ser. No. 63/387,878, filed Dec. 16, 2022, the contents of which are incorporated herein by reference.

TECHNICAL FIELD

Examples of the disclosure relate generally to databases and, more specifically, to sharing of secured data.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
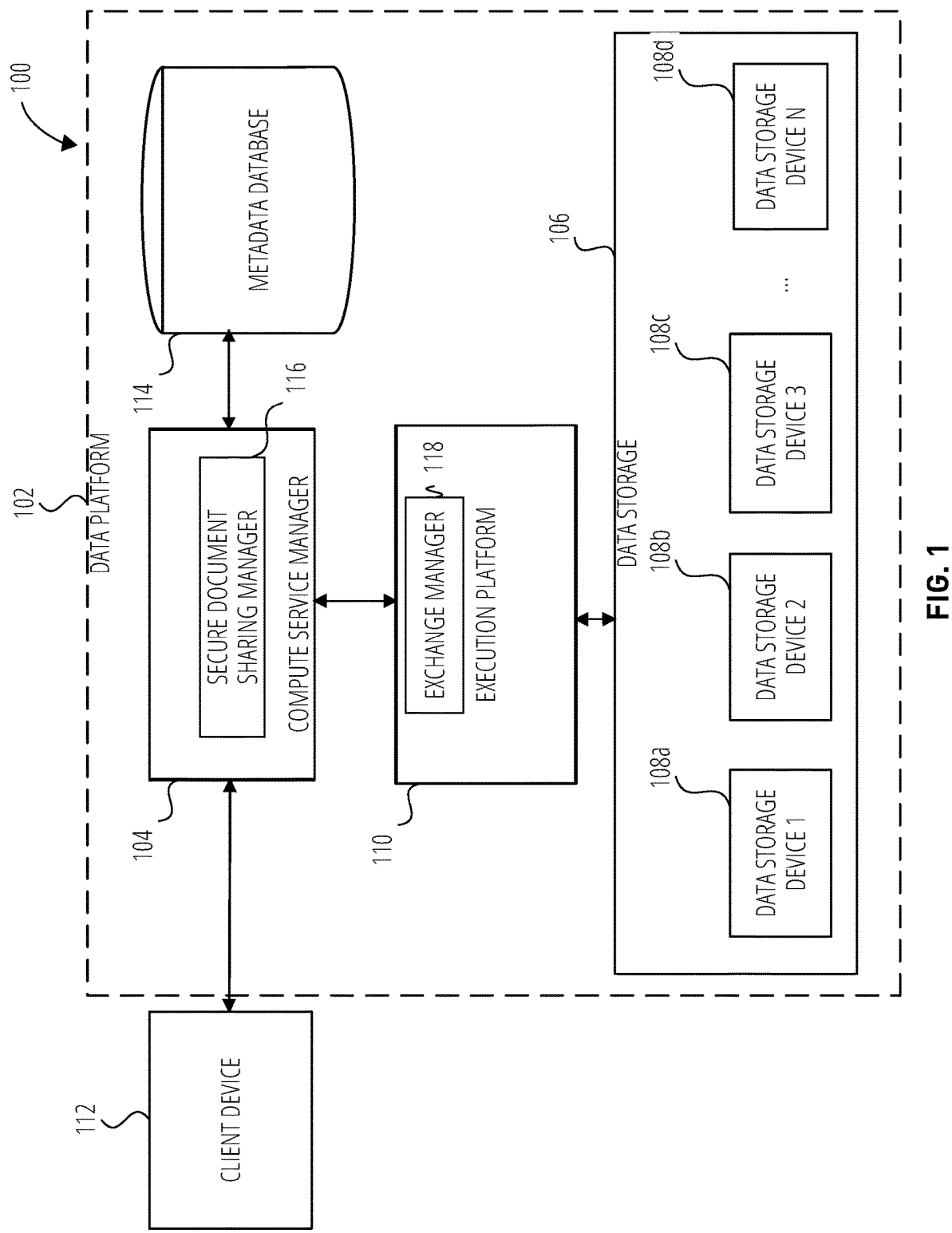
FIG. 1 illustrates an example computing environment that includes a network-based data platform in communication with a cloud storage provider system, in accordance with some examples.

Providers of data products on data platforms periodically respond to questionnaires from consumers regarding performance levels, regulatory compliance such as data security, and privacy protections of the data platform. Completing the questionnaires is time consuming because often the questionnaires are unstructured and even though the data needed to complete the questionnaires may be readily available, it may be difficult to collate because the data may be unstructured or semi-structured. Accordingly, the questionnaires are often manually completed by the provider. In addition, providers of the data used to complete the questionnaires may want to ensure that the data used for completion of the questionnaires remains secure. Previous systems have relied on predefined libraries of questions and associated answers that are documented in a specific/structured format. However, providers desire methodologies to auto-generate responses based on information held within a repository of unstructured data, that might include files in various formats: such as text files, audio/video files etc.

In some examples, an automated questionnaire completion capability is integrated with data platform data exchange listings that contain unstructured data files. This allows consumers to submit questionnaires directly to the data platform and automatically obtain a completion of the questionnaire. The data platform generates these responses via AI-based processing of the underlying unstructured data files that are being shared within the same exchange listing.

In some examples, a data platform receives from a consumer an unstructured questionnaire to be completed based on structured database objects, semi-structured database objects, and unstructured database objects stored on the data platform by a provider. The data platform generates a secured completion of the unstructured questionnaire based on a questionnaire completion model and the unstructured questionnaire. The data platform determines a confidence score for the secured completion. In response to determining the confidence score does not exceed a threshold value, the data platform generates a structured query based on the unstructured questionnaire and a structured query model and generates the secured completion based on querying the structured database objects using the structured query. The data platform applies a security function to the secured completion to generate a completion of the unstructured questionnaire and provides the completion to the consumer.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 1 108a, data storage device 2 108b, data storage device 3 108c, and data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102. The compute service manager 104 comprises a secure document sharing manager 116 that processes data objects generated by the compute service manager 104 during communications with a consumer the client device 112.

The compute service manager 104 is also coupled to metadata database 114. The metadata database 114 stores data pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 include data of metrics describing usage and access by providers and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110. The execution platform 110 further comprises an exchange manager 118 that accesses and processes data objects stored in the data storage 106 as more fully described in reference to FIG. 6A.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
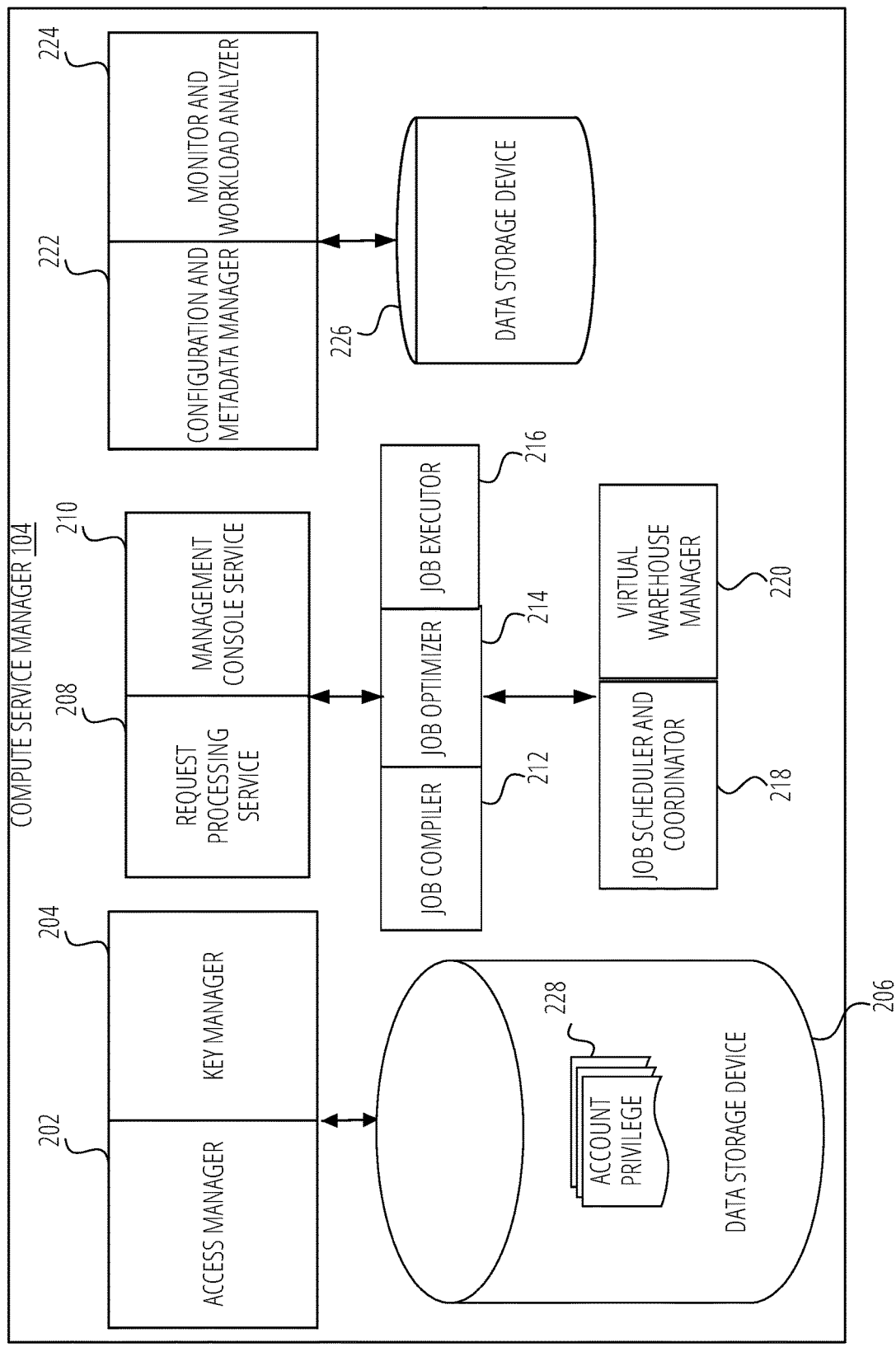
FIG. 2 is a block diagram illustrating components of a compute service manager, in accordance with some examples.

FIG. 2 is a block diagram illustrating components of the compute service manager 104, in accordance with some examples. As shown in FIG. 2, the compute service manager 104 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 106). As used herein, the remote storage devices may also be referred to as "persistent storage devices" or "shared storage devices."

In some examples, the access manager 202 authorizes access to object of the data platform 102 based on one or more sets of access privileges stored on the data storage device 206, such as a set of account privileges 228.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304*a*) may need to communicate with another execution node (e.g., execution node 2 304*b*), and should be disallowed from communicating with a third execution node (e.g., execution node 1 316*a*) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
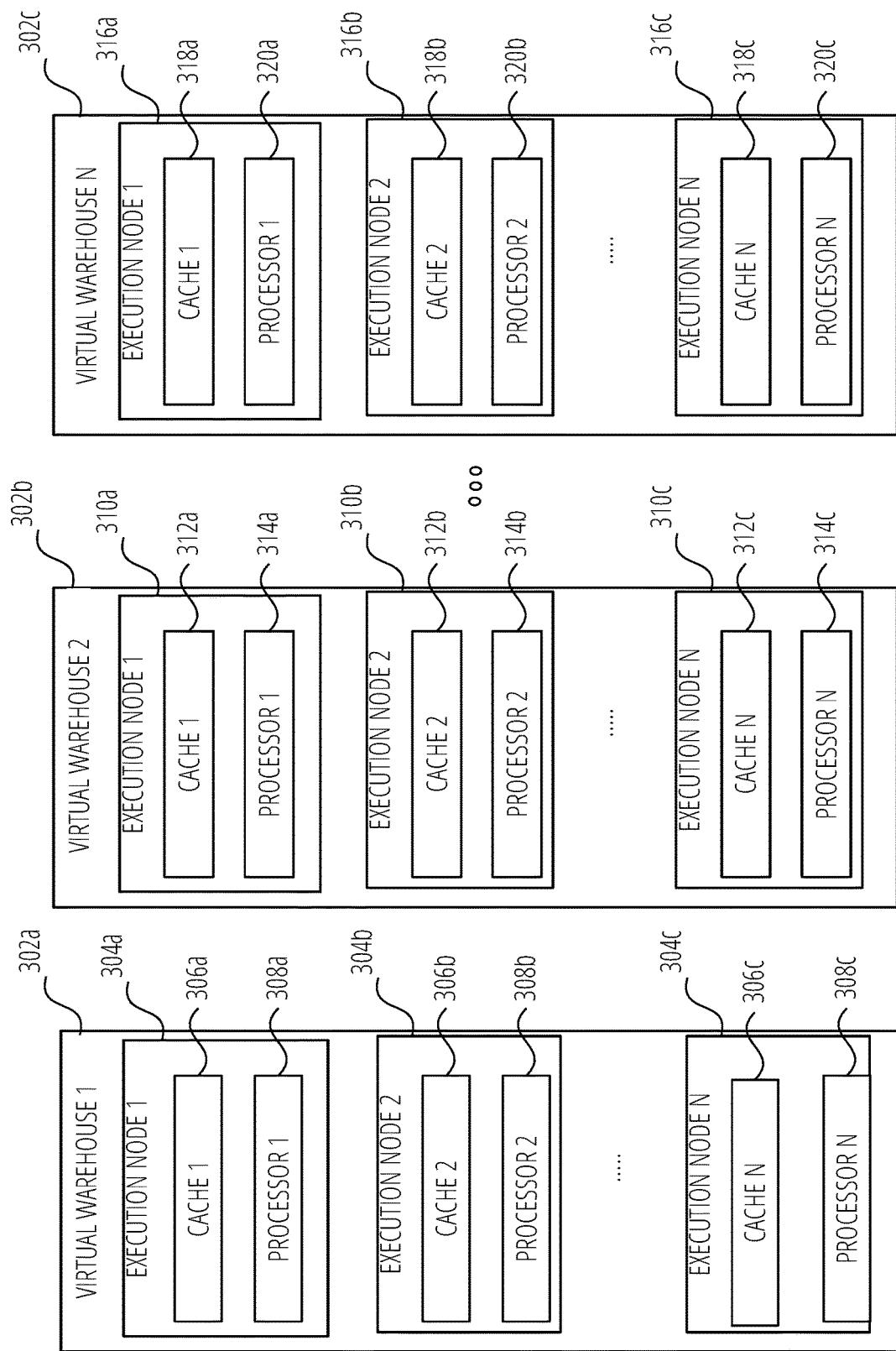
FIG. 3 is a block diagram illustrating components of an execution platform, in accordance with some examples.

FIG. 3 is a block diagram illustrating components of the execution platform 110, in accordance with some examples. As shown in FIG. 3, the execution platform 110 includes multiple virtual warehouses, including virtual warehouse 1 302*a*, and virtual warehouse 2 302*b* to virtual warehouse N 302*c*. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302*a* includes a plurality of execution nodes as exemplified by execution node 1 304*a*, execution node 2 304*b*, and execution node N 304*c*. Execution node 1 304*a* includes cache 1 306*a* and a processor 1 308*a*. Execution node 2 304*b* includes cache 2 306*b* and processor 2 308*b*. Execution node N 304*c* includes cache N 306*c* and processor N 308*c*. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302*a* discussed above, virtual warehouse 2 302*b* includes a plurality of execution nodes as exemplified by execution node 1 310*a*, execution node 2 310*b*, and execution node N 310*c*. Execution node 1 304*a* includes cache 1 312*a* and processor 1 314*a*. Execution node 2 310*b* includes cache 2 312*b* and processor 2 314*b*. Execution node N 310*c* includes cache N 312*c* and processor N 314*c*. Additionally, virtual warehouse N 302*c* includes a plurality of execution nodes as exemplified by execution node 1 316*a*, execution node 2 316*b*, and execution node N 316*c*. Execution node 1 316*a* includes cache 1 318*a* and processor 1 320*a*. Execution node 2 316*b* includes cache 2 318*b* and processor 2 320*b*. Execution node N 316*c* includes cache N 318*c* and processor N 320*c*.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302*a* implements execution node 1 304*a* and execution node 2 304*b* on one computing platform at a geographic location and implements execution node N 304*c* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
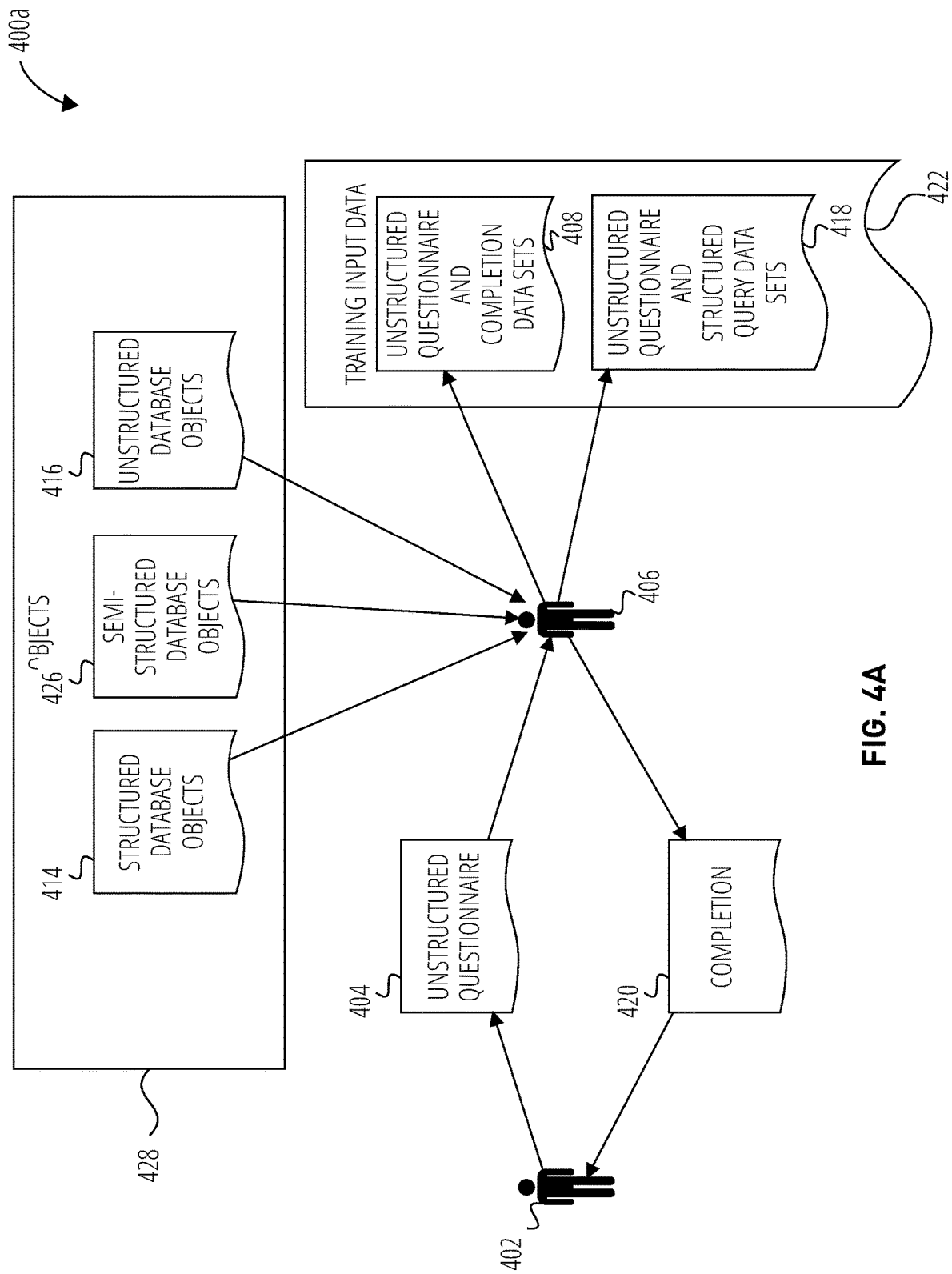
FIG. 4A illustrates a process for generating training data, in accordance with some examples.

FIG. 4A illustrates a training data generating process 400*a*, in accordance with some examples. Training input data 422 is used by a data platform 102 to train one or more Natural Language Processing (NLP) models that generate completions, such as completion 420, to unstructured questionnaires, such as unstructured questionnaire 404, submitted by the consumer 402. During a course of interactions between a consumer 402 and a provider 406, the consumer 402 submits a series of unstructured questionnaires 404 to the provider 406. The provider 406 receives the unstructured questionnaires 404 and generates one or more completions 420 that to any questions contained in the unstructured questionnaires 404 based on data objects 428 stored in the data platform 102, such as structured database objects 414, semi-structured database objects 426, and unstructured database objects 416. The objects 428 can be any kind of database object containing information that a provider wants to allow a consumer to access via an unstructured questionnaire 404. The objects 428 may be structured database objects 414 that can be searched using a query, such as a data table or the like. The objects 428 may also be semi-structured database objects 426 comprising structured data but lacking a schema defining the meaning of the data, such as electronic documents in any proprietary or non-proprietary format used for any purpose such as, but not limited to objects in a format such as .pdf, .pptx, .docx, or the like. The objects 428 may also be unstructured database objects 416 containing text and non-text data in any proprietary or non-proprietary format such as, but not limited to: .txt, .png, .jpg, or the like. For example, the objects 428 can comprise any structured, semi-structured, or unstructured text or non-text data such as, but not limited to: word processing documents, documents in exchange formats containing text and/or graphics, textual or audio-visual presentations, images, video recordings, audio recordings, electronic communications communicated using any and all proprietary or non-proprietary platform, and the like.

The provider 406 also generates tuples of unstructured questionnaire and completion data sets 408 based on the unstructured questionnaires 404 and their corresponding completions 420. The provider 406 also generates tuples of unstructured questionnaire and structured query data sets 418 based on the unstructured questionnaire 404 and an interpretation of the unstructured questionnaires 404 by the provider 406. The unstructured questionnaire and completion data sets 408 and the unstructured questionnaire and structured query data sets 418 are included in the training input data 422.

Figure 4B:
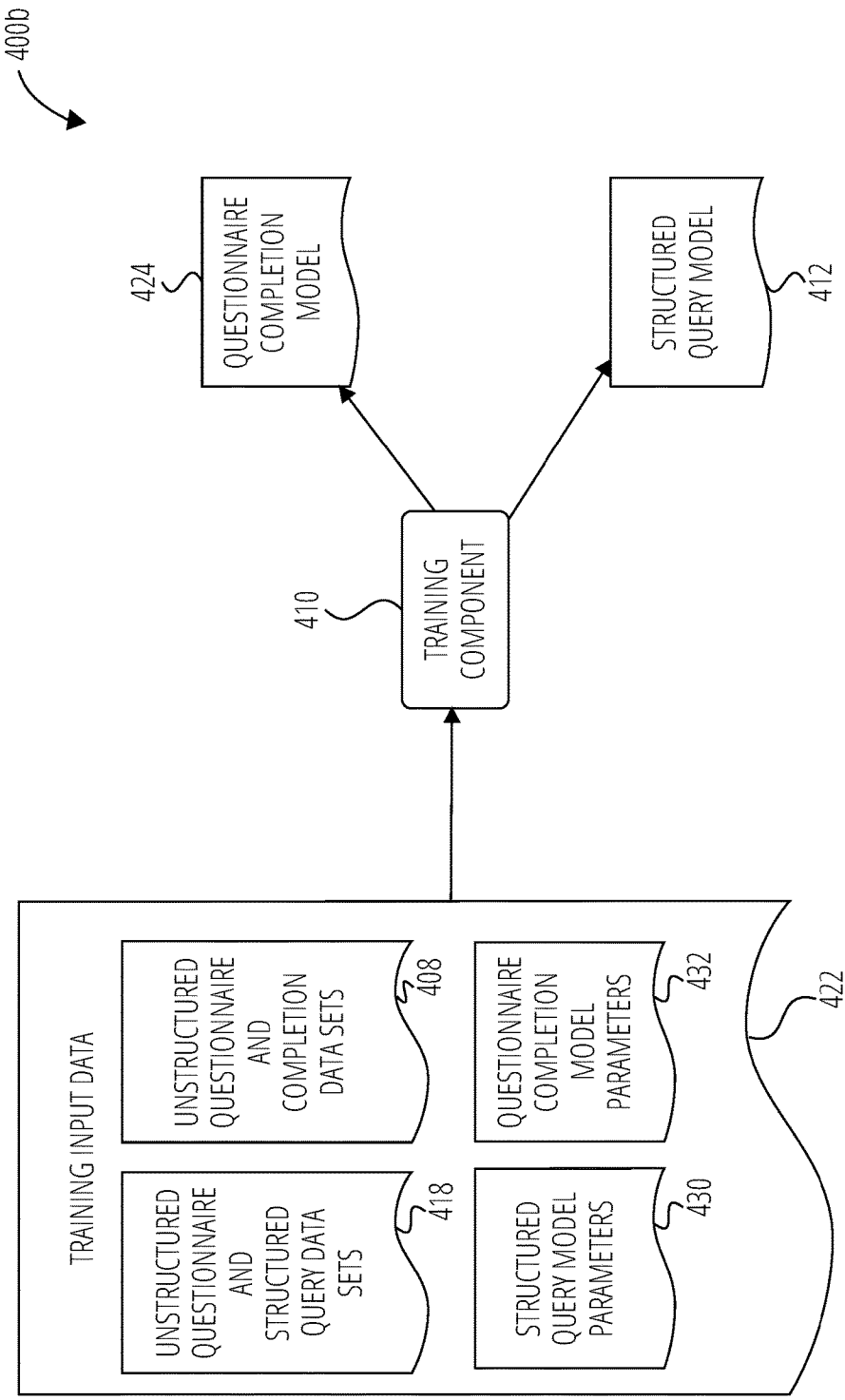
FIG. 4B illustrates a process for training models, in accordance with some examples.

FIG. 4B illustrates a training process 400*b* for training NLP models, in accordance with some examples. The training process is used by a provider to train one or more NLP models to perform various language recognition and processing tasks when processing unstructured questionnaires. For example, a training component 410 uses training input data 422 to train a questionnaire completion model 424 and a structured query model 412 based on artificial intelligence methodologies. The training input data 422 includes tuples of unstructured questionnaire and completion data sets 408 and questionnaire completion model parameters 432 the are used by the training component 410 to train the questionnaire completion model 424. The questionnaire completion model 424 is used to generate completions of unstructured questionnaires without accessing additional data objects of a data platform 102 (of FIG. 1). The unstructured questionnaire and completion data sets 408 include training data sets comprised of paired unstructured questionnaires 404 submitted by consumers 402 and completions 420 prepared by providers 406. The questionnaire completion model parameters 432 comprise parameters or coefficients of the questionnaire completion model 424. During training, the questionnaire completion model parameters 432 are adapted based on input-output training pairings of the unstructured questionnaires 404 and the completions 420 of the unstructured questionnaire and completion data sets 408. After the questionnaire completion model parameters 432 are adapted (after training), the questionnaire completion model parameters 432 are used by questionnaire completion model 424 to generate completions using input unstructured questionnaires.

The training component 410 trains the questionnaire completion model 424 based on one or more machine learning techniques using the unstructured questionnaire and completion data sets 408. For example, the training component 410 may train the questionnaire completion model parameters 432 by minimizing a loss function based on the ground-truth of the completions 420 included in the unstructured questionnaire and completion data sets 408. The questionnaire completion model 424 can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, and the like.

In some examples, a derivative of a loss function is computed based on a comparison of an estimated completion for an unstructured questionnaire and the ground truth of a paired completion for the unstructured questionnaire produced by a provider 406 and the questionnaire completion model parameters 432 of the questionnaire completion model 424 are updated based on the computed derivative of the loss function.

In some examples, the training component 410 receives a batch of training data that includes a set of unstructured questionnaires associated with a ground truth of a set of completions prepared by a provider 406 in response to the set of unstructured questionnaires. The training component 410 generates a feature vector based on the set of unstructured questionnaires and the questionnaire completion model 424 generates a prediction comprised of an estimated set of completions. The prediction is compared with the ground truth of the set of completions and one or more questionnaire completion model parameters 432 of the questionnaire completion model 424 are updated based on the comparison.

The result of minimizing the loss function for multiple sets of training data trains, adapts, or optimizes the questionnaire completion model parameters 432 of the questionnaire completion model 424. In this way, the questionnaire completion model 424 is trained to establish a relationship between an unstructured questionnaire and a completion.

In a similar manner, the training component 410 trains a structured query model 412 using the training input data 422 to train the structured query model 412 based on artificial intelligence methodologies. The training input data 422 includes tuples of unstructured questionnaire and structured query data sets 418 and structured query model parameters 430 that are used by the training component 410 to train a structured query model 412. The trained structured query model 412 is used to generate a structured query using an unstructured questionnaire 404. The structured query is used to query structured database objects 414 of the data platform 102 for data used to generate a completion 420 for the unstructured questionnaire 404. The unstructured questionnaire and structured query data sets 418 include training data sets comprised of paired unstructured questionnaires 404 submitted by consumers 402 and structured queries that are used to query the structured database objects 414 for data used to generate the completion 420. The structured query model parameters 430 comprise parameters or coefficients of the structured query model 412. During training, the structured query model parameters 430 are adapted based on input-output training pairings of the unstructured questionnaires 404 and the structured queries of the unstructured questionnaire and structured query data sets 418. After the structured query model parameters 430 are adapted (after training), the structured query model parameters 430 are used by the structured query model 412 to generate structured queries using input unstructured questionnaires. The results of the structured queries are used to generate completions that are responsive to the unstructured questionnaires.

The training component 410 trains the structured query model 412 based on one or more machine learning techniques using the unstructured questionnaire and structured query data sets 418. For example, the training component 410 may adapt or train the structured query model parameters 430 by minimizing a loss function based on the ground-truth of the structured queries included in the unstructured questionnaire and structured query data sets 418. The structured query model 412 can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, and the like.

In some examples, a derivative of a loss function is computed based on a comparison of an estimated structured query for an unstructured questionnaire and the ground truth of a paired structured query for the unstructured questionnaire produced by a provider 406 and the structured query model parameters 430 of the structured query model 412 are updated based on the computed derivative of the loss function.

In some examples, the training component 410 receives a batch of training data that includes a set of unstructured questionnaires associated with a ground truth of a set of structured queries prepared by a provider 406 in response to the set of unstructured questionnaires. The training component 410 generates a feature vector based on the set of unstructured questionnaires and the structured query model 412 generates a prediction comprised of an estimated set of structured queries. The prediction is compared with the ground truth of the set of structured queries and one or more structured query model parameters 430 of the questionnaire structured query model 412 are updated based on the comparison.

The result of minimizing the loss function for multiple sets of training data trains, adapts, or optimizes the structured query model parameters 430 of the structured query model 412. In this way, the structured query model 412 is trained to establish a relationship between an unstructured questionnaire and a structured query.

Figure 5:
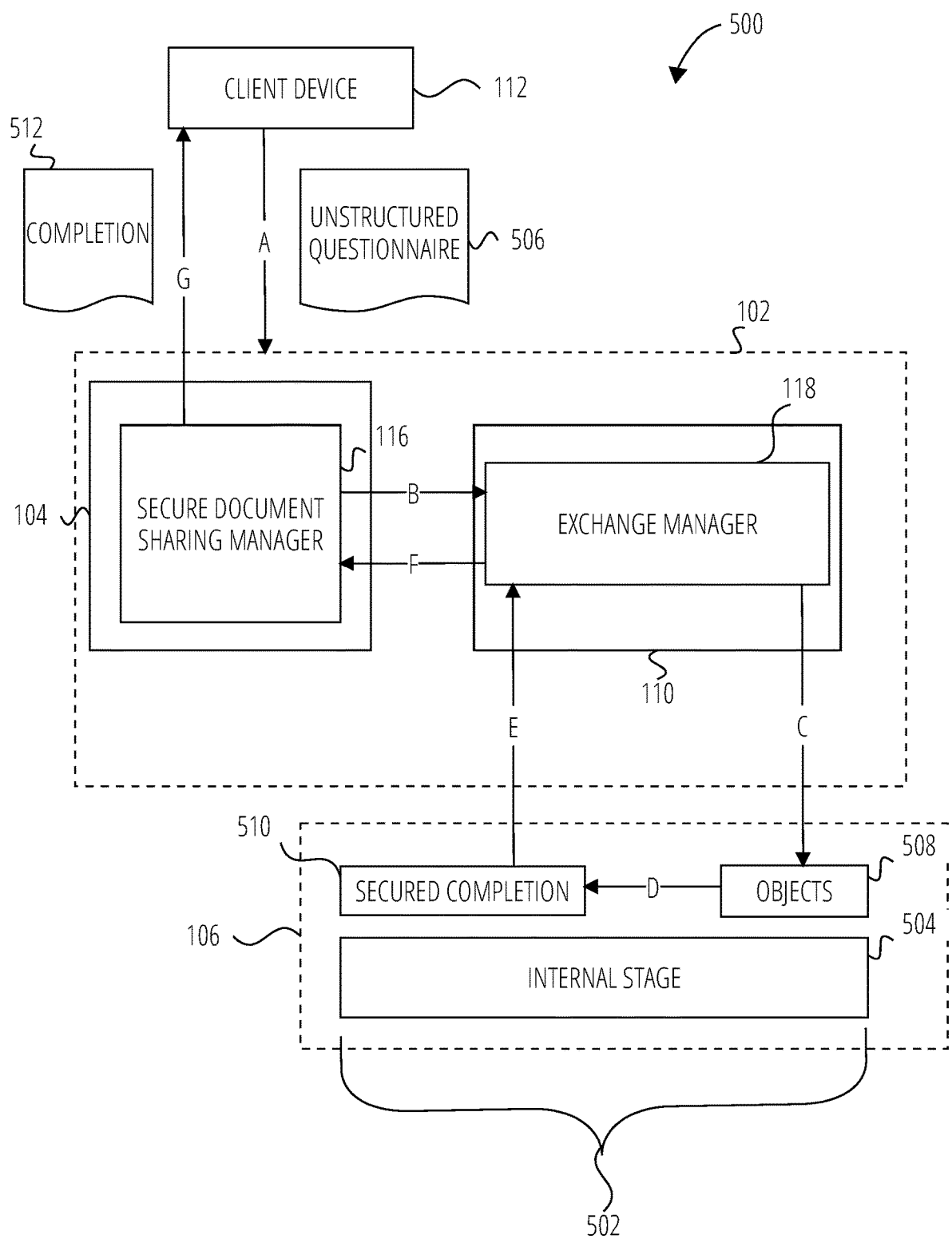
FIG. 5 illustrates an example secure computing environment with secure document sharing based on security functions, in accordance with some examples.

FIG. 5 illustrates an example secure computing environment with secure document sharing based on security functions, in accordance with some examples. A secure computing environment 500 is similar to the computing environment 100 (of FIG. 1) and includes one or more client devices 112 in communication with a cloud computing platform with a network-based data platform 102 and data stages 502. The network-based data platform 102 includes a compute service manager 104 and the execution platform 110. The data stages 502 include data storage 106 with an internal stage 504. The internal stage 504 stores one or more database objects such as objects 508. The objects 508 can be any kind of database object containing information that a provider wants to allow a consumer to access that is responsive to the unstructured questionnaire 506. The objects may be structured database objects that can be searched using a query, such as a data table or the like. The objects may also be semi-structured database objects comprising structured data but lacking a schema defining the meaning of the data, such as electronic documents in any proprietary or non-proprietary format used for any purpose such as, but not limited to objects in a format such as .pdf, .pptx, .docx, or the like. The objects may also be unstructured database objects containing text and non-text data in any proprietary or non-proprietary format such as, but not limited to: .txt, .png, .jpg, or the like. For example, the objects 508 can comprise any structured, semi-structured, or unstructured text or non-text data such as, but not limited to: word processing documents, documents in exchange formats containing text and/or graphics, textual or audio-visual presentations, images, video recordings, audio recordings, electronic communications communicated using any proprietary or non-proprietary platform, and the like.

The compute service manager 104 is configured with a secure document sharing manager 116, and the execution platform 110 is configured with an exchange manager 118.

At operation A, the data consumer uses client device 112 to submit an unstructured questionnaire 506 for information stored in the objects 508 data set (e.g., one or more objects 508 responsive to the query). The unstructured questionnaire 506 may be for any purpose. In some examples, the unstructured questionnaire 506 is submitted by the consumer for the collection of financial, contractual, or regulatory compliance data that is in the possession of the provider and is desired by the consumer.

The secure document sharing manager 116 receives the unstructured questionnaire 506 and, at operation B, invokes the exchange manager 118 at the execution platform 110 to parse the unstructured questionnaire 506 and generates one or more completions 512 that are responsive to the unstructured questionnaire 506.

At operation C, the exchange manager 118 accesses the objects 508 and at operation D generates one or more secured completions 510 based on the objects 508. The process of generating the secured completions 510 is more fully described with reference to FIG. 6A.

At operation E, the exchange manager 118 retrieves the secured completions 510 and at operation F forwards them to a secure document sharing manager 116 of a compute service manager 104. The secure document sharing manager 116 performs one or more security functions on the secured completions 510 before communicating them as completion 512 to the consumer. In some examples, the security functions include watermarking (e.g., adding a watermark to generate the completion 512 such as identification information of the data consumer account associated with the client device 112 sending the unstructured questionnaire 506, an edit password lock (e.g., requiring a password for editing the completion 512), or a read password lock (e.g., requiring a password for reading the completion 512).

In some examples, at operation F, the secure document sharing manager 116 may further generate a scoped URL that the consumer may use to access the secured completions 510 and the scoped URL is communicated to the consumer as the completion 512. In some examples, the scoped URL may be generated by the execution platform 110 and is communicated to the secure document sharing manager 116 at operation F. In some examples, the scoped URL includes an encrypted hash associated with the completion 512. In some examples, the encrypted hash of the scoped URL may further include identification information of the client device 112, a query ID of the unstructured questionnaire 506, a file path associated with the storage location of the secured completions 510, stage information for the stage including the storage location (e.g., storage platform location of the internal stage 504), and expiration period of the scoped URL.

At operation G, the secure document sharing manager 116 communicates the completion 512 to the consumer via the client device 112.

In some examples, when the completion 512 takes the form of the scoped URL, in subsequent processing functionalities, the secure document sharing manager 116 detects that the data consumer has activated (or selected) the scoped URL and performs additional authentication functions before granting the client device 112 access to the secured completions 510. For example, the secure document sharing manager 116 performs the following functions: (a) authenticates the data consumer (e.g., the user of client device 112) using secure credentials associated with data consumer (e.g., user logging credentials), (b) validates that the logged-in user was the one who submitted the unstructured questionnaire 506; (c) validates that the scoped URL is not expired; and (d) redirects the user to a short-lived (e.g., with a duration of 60 seconds or several minutes) pre-signed URL of the one or more secured completions 510 stored in internal stage 504 of the data storage 106.

Figure 6A:
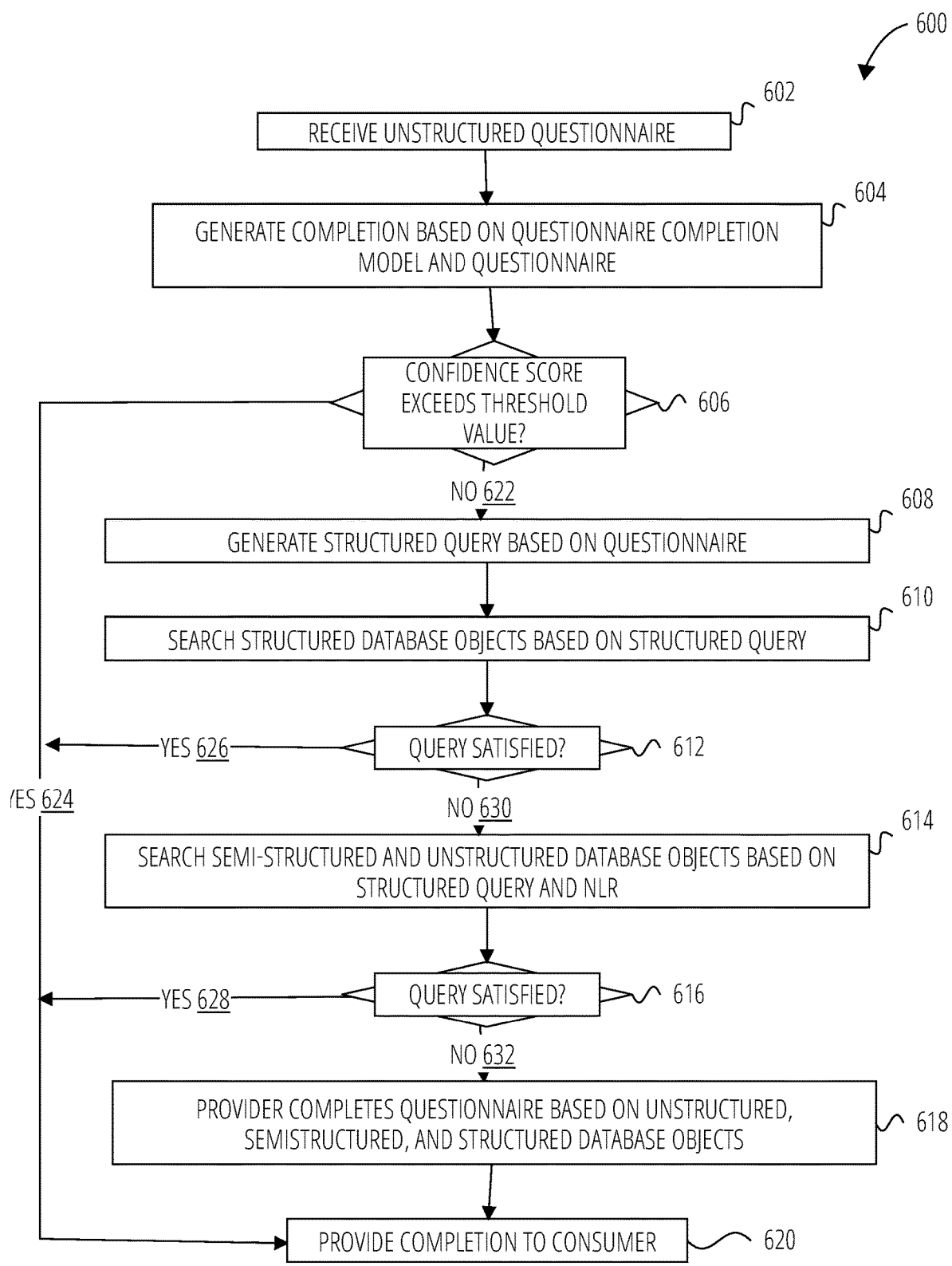
FIG. 6A is a process flow diagram of a completion generation method for generating a completion of a questionnaire, in accordance with some examples.
Figure 6B:
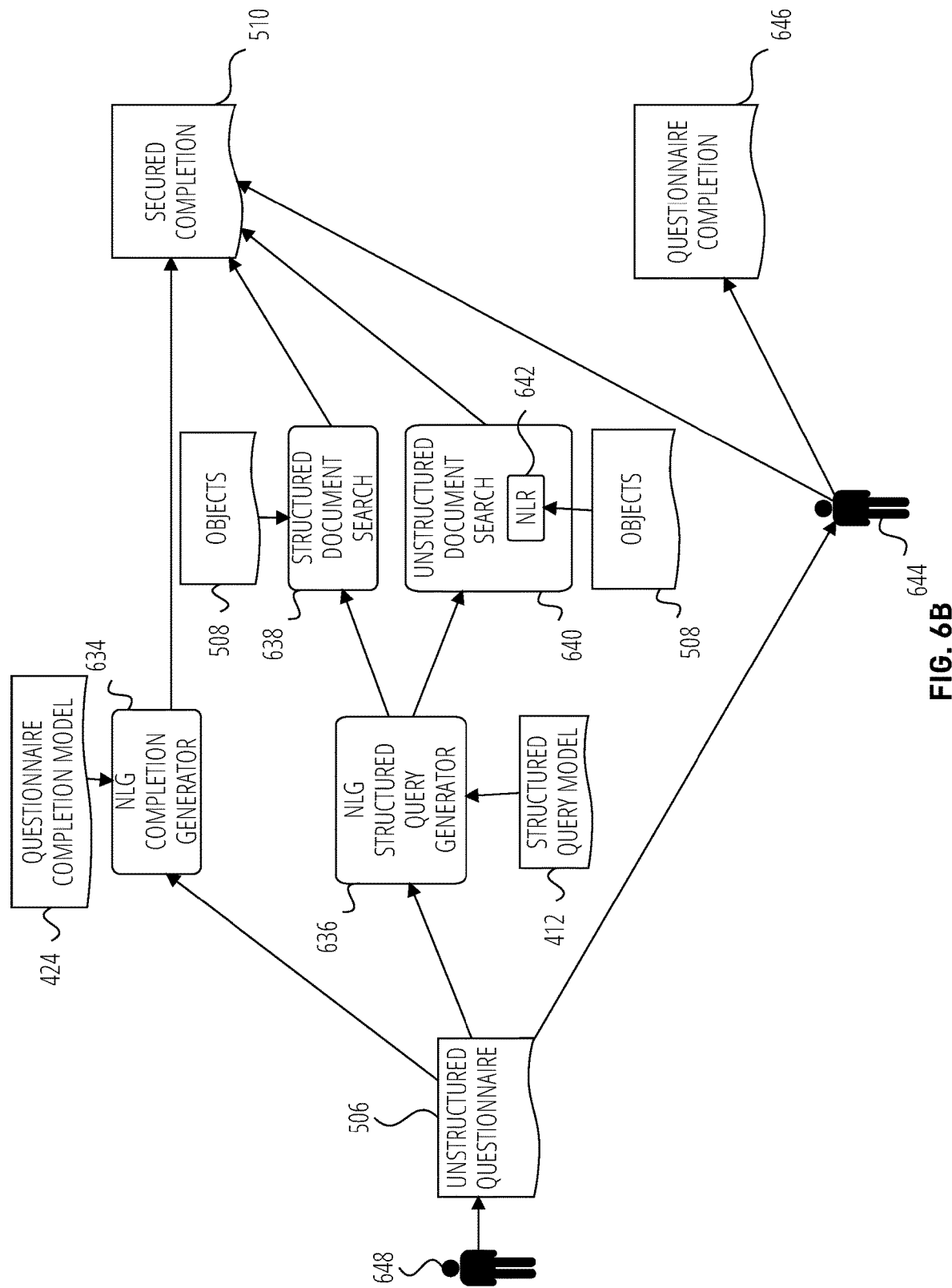
FIG. 6B is a software architecture diagram, in accordance with some examples.

FIG. 6A is a process flow diagram of a completion generation method for generating a completion of a questionnaire and FIG. 6B is a software architecture diagram, in accordance with some examples.

A data platform 102 (of FIG. 1) uses a completion generation method 600 to generate a completion of a questionnaire submitted by a consumer. The completion is based on database objects that are stored by the provider on the data platform 102.

Although the example completion generation method 600 depicts a particular sequence of operations, the sequence may be altered without departing from the scope of the present disclosure. For example, some of the operations depicted may be performed in parallel or in a different sequence that does not materially affect the function of the completion generation method 600. In other examples, different components of an example device or system that implements the completion generation method 600 may perform functions at substantially the same time or in a specific sequence.

In operation 602, the data platform 102 receives an unstructured questionnaire 506 from a consumer 648. For example, the consumer 648 a client device 112 (of FIG. 1) to submit the unstructured questionnaire 506 to the data platform 102.

In operation 604, an exchange manager 118 (of FIG. 1) of the data platform 102 uses a Natural Language Generator (NLG) completion generator 634 of an exchange manager 118 (of FIG. 1) to generate a secured completion 510 based on the unstructured questionnaire 506 and a previously generated questionnaire completion model 424. For example, the NLG completion generator 634 receives the unstructured questionnaire 506 and uses the previously described questionnaire completion model 424 to generate the secured completion 510 without accessing any of the objects 508 (of FIG. 5) stored on the data platform 102 by the provider. In addition to generating the secured completion 510, the NLG completion generator 634 generates a confidence score of how accurate the secured completion 510 is as compared to a secured completion 510 that would have been generated manually by the provider 644.

In operation 606, the exchange manager 118 determines if the confidence score exceeds a threshold value indicating that there is a high probability that the secured completion 510 generated by the NLG completion generator 634 accurately matches a completion that would have been generated by the provider 644. In response to determining that the confidence score exceeds the threshold value, the exchange manager 118 transitions 624 to operation 620.

In operation 620, the exchange manager 118 provides the secured completion 510 to the consumer 648. For example, the exchange manager 118 provides the secured completion 510 to the consumer using a secure document sharing manager 116 of a compute service manager 104 as more fully described in reference to FIG. 5.

In operation 606, in response to determining that the confidence score does not exceed the threshold value, the exchange manager 118 transitions 622 to operation 608.

In operation 608, the exchange manager 118 generates a structured query based on the unstructured questionnaire 506. For example, the exchange manager 118 uses a structured query generator 636 and previously described structured query model 412 to generate a structured query. The structured query can be used to query structured database objects, such as structured database objects 414 (of FIG. 4A) of objects 508, to find data that can be used to generate the secured completion 510.

In operation 610, the exchange manager 118 uses a structured database object search component 638 to search the structured database objects 414 of the objects 508 to find data to form the secured completion 510. For example, the structured database object search component 638 generates a query in SQL and uses the resources of the data platform 102 to search the structured database objects of the objects 508 to find data that satisfies the structured query.

In operation 612, the exchange manager 118 determines if the structured query generated from the unstructured questionnaire 506 was satisfied. In response to determining that the structured query was satisfied, the exchange manager 118 transitions 626 to operation 620 and provides the secured completion 510 to the consumer as previously described. In response to determining that the structured query was not satisfied, the exchange manager 118 transitions 630 to operation 614.

In operation 614, the exchange manager 118 searches semi-structured database objects and unstructured database objects of objects 508 (e.g., semi-structured database objects 426 and unstructured database objects 416 of FIG. 4A) using a semi and unstructured database object search component 640 and the structured query to search the semi and unstructured database objects of objects 508. For example, the semi and unstructured database object search component 640 includes a Natural Language Recognition (NLR) component 642 to parse text objects the semi-structured database objects and unstructured database objects of objects 508 to generate one or more searchable models of any of the semi-structured database objects and unstructured database objects of objects 508. The semi and unstructured database object search component 640 then searches the searchable models based on the structured query in order to find data that can be used to form the secured completion 510.

In some examples, the unstructured database objects 416 may include non-text objects, such as images, video files, and audio files. The exchange manager 118 searches for meta-data associated with these objects in order to satisfy the structured query. In some examples, the exchange manager 118 generates metadata for the non-text objects such as using optical recognition methodologies, speech to text methodologies, optical character recognition methodologies, and the like, and searches the metadata for data to satisfy the structured query. In some examples, the exchange manager 118 generates captions for video files or images of the non-text objects and searches the captions for data to satisfy the structured query. In some examples, the exchange manager 118 generates transcripts for video or audio files of the non-text objects and searches the transcripts for data to satisfy the structured query.

In operation 616, the exchange manager 118 determines if the structured query was satisfied by searching through the semi-structured database objects and unstructured database objects of the objects 508. In response to determining that the structured query was satisfied, the exchange manager 118 transitions 628 to operation 620 and provides the secured completion 510 to the consumer 648 as previously described. In response to determining that the structured query was not satisfied, the exchange manager 118 transitions 632 to operation 618, thus determining that the data platform cannot automatically complete the unstructured questionnaire.

In operation 618, the exchange manager 118 notifies the provider 644 that the unstructured questionnaire 506 could not be automatically completed and the provider 644 manually generates the secured completion 510 based on the objects 508.

In operation 620, the exchange manager 118 receives the secured completion 510 from the provider 644 and provides the secured completion 510 generated by the provider 644 to the consumer 648 as previously described.

In some examples, the provider 644 generates a questionnaire completion 646 tuple that is added to the training input data 422 (of FIG. 4A) and retrains the questionnaire completion model 424 and the structured query model 412 are previously described in reference to FIG. 4A and FIG. 4B.

Figure 7:
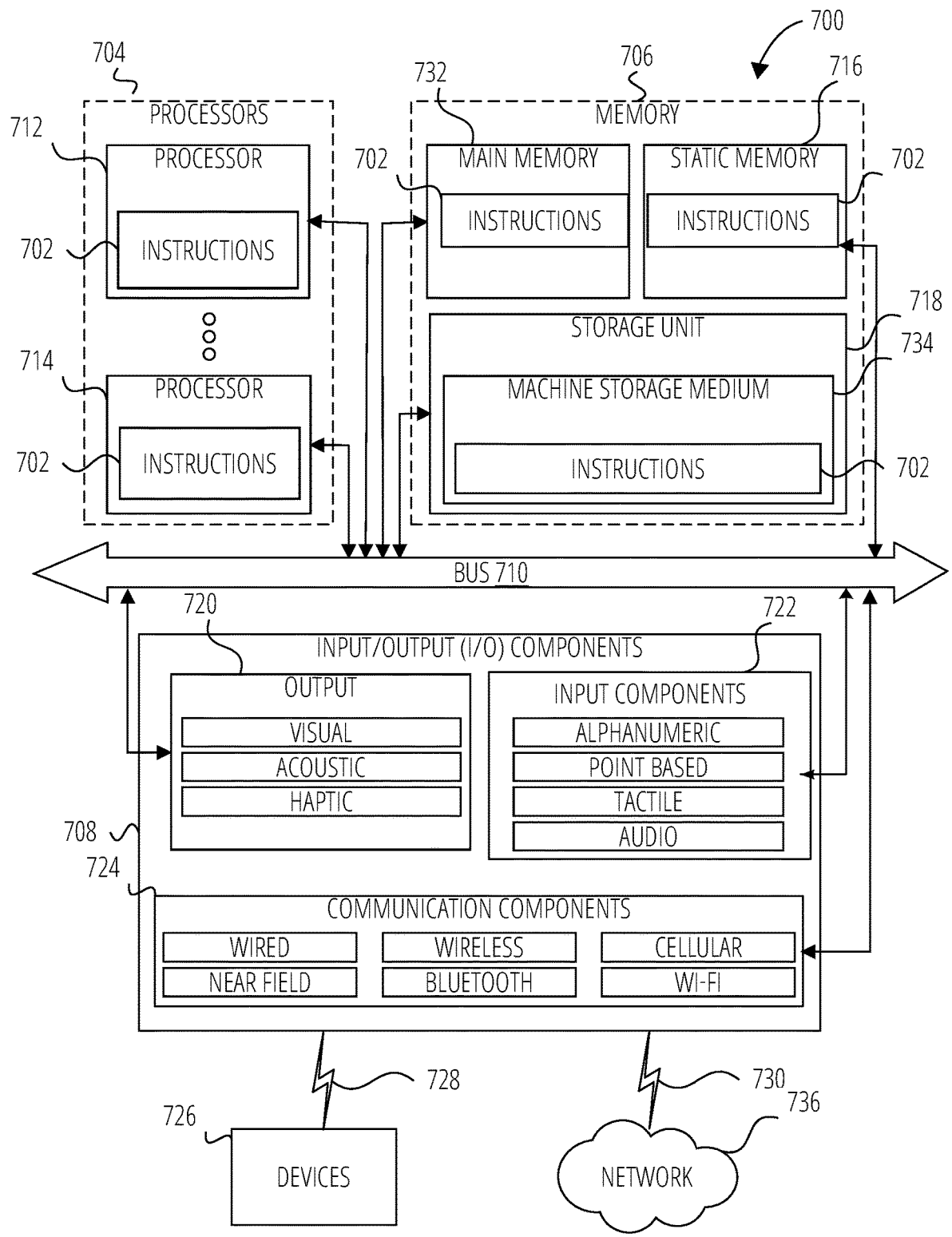
FIG. 7 illustrates a diagrammatic representation of a machine in the form of a computer system within which a set of instructions may be executed for causing the machine to perform any one or more of the methodologies discussed herein, in accordance with some examples.

FIG. 7 illustrates a diagrammatic representation of a machine 700 in the form of a computer system within which a set of machine-readable instructions may be executed for causing the machine 700 to perform any one or more of the methodologies discussed herein, according to examples. Specifically, FIG. 7 shows a diagrammatic representation of the machine 700 in the example form of a computer system, within which computer-readable instructions 702 (e.g., software, a program, an application, an applet, a data application, or other executable code) for causing the machine 700 to perform any one or more of the methodologies discussed herein may be executed. For example, the instructions 702 may cause the machine 700 to execute any one or more operations of any one or more of the methods described herein. In this way, the instructions 702 transform a general, non-programmed machine into a particular machine 700 (e.g., the compute service manager 104, the execution platform 110, and the data storage devices 1 to N of data storage 106) that is specially configured to carry out any one of the described and illustrated functions in the manner described herein.

In alternative examples, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 702, sequentially or otherwise, that specify actions to be taken by the machine 700. Further, while only a single machine 700 is illustrated, the term "machine" shall also be taken to include a collection of machines that individually or jointly execute the instructions 702 to perform any one or more of the methodologies discussed herein.

The machine 700 includes processors 704, memory 706, and I/O components 708 configured to communicate with each other such as via a bus 710. In some examples, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 712 and a processor 714 that may execute the instructions 702. The term "processor" is intended to include multi-core processors that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 may include a main memory 732, a static memory 716, and a storage unit 718 including a machine storage medium 734, all accessible to the processors 704 such as via the bus 710. The main memory 732, the static memory 716, and the storage unit 718 store the instructions 702 embodying any one or more of the methodologies or functions described herein. The instructions 702 may also reside, completely or partially, within the main memory 732, within the static memory 716, within the storage unit 718, within at least one of the processors 704 (e.g., within the processor's cache memory), or any suitable combination thereof, during execution thereof by the machine 700.

The input/output (I/O) components 708 include components to receive input, provide output, produce output, transmit information, exchange information, capture measurements, and so on. The specific I/O components 708 that are included in a particular machine 700 will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various examples, the I/O components 708 may include output components 720 and input components 722. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 722 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 708 may include communication components 724 operable to couple the machine 700 to a network 736 or devices 726 via a coupling 730 and a coupling 728, respectively. For example, the communication components 724 may include a network interface component or another suitable device to interface with the network 736. In further examples, the communication components 724 may include wired communication components, wireless communication components, cellular communication components, and other communication components to provide communication via other modalities. The devices 726 may be another machine or any of a wide variety of peripheral devices (e.g., a peripheral device coupled via a universal serial bus (USB)). For example, as noted above, the machine 700 may correspond to any one of the compute service manager 104, the execution platform 110, and the devices 726 may include the data storage device 226 or any other computing device described herein as being in communication with the data platform 102 or the data storage 106.

The various memories (e.g., 706, 716, 732, and/or memory of the processor(s) 704 and/or the storage unit 718) may store one or more sets of instructions 702 and data structures (e.g., software) embodying or utilized by any one or more of the methodologies or functions described herein. These instructions 702, when executed by the processor(s) 704, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "non-transitory machine-storage media," "non-transitory computer-storage media," and "non-transitory device-storage media" specifically exclude carrier waves, modulated data signals, and other such media, at least some of which are covered under the term "signal medium" discussed below.

In various examples, one or more portions of the network 736 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 736 or a portion of the network 736 may include a wireless or cellular network, and the coupling 730 may be a Code Division Multiple Access (CDMA) connection, a Global System for Mobile communications (GSM) connection, or another type of cellular or wireless coupling. In this example, the coupling 730 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 702 may be transmitted or received over the network 736 using a transmission medium via a network interface device (e.g., a network interface component included in the communication components 724) and utilizing any one of a number of well-known transfer protocols (e.g., hypertext transfer protocol (HTTP)). Similarly, the instructions 702 may be transmitted or received using a transmission medium via the coupling 728 (e.g., a peer-to-peer coupling) to the devices 726. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 702 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A computer-implemented method of a secure computing environment, the computer-implemented method comprising:
  receiving, by a secure document sharing manager of the secure computing environment, from a consumer, an unstructured questionnaire to be completed for a provider account storing one or more database objects in the secure computing environment;
  invoking, by the secure document sharing manager, an exchange manager of the secure computing environment;
  generating, by the exchange manager, a secured completion of the unstructured questionnaire using a questionnaire completion model and the unstructured questionnaire without accessing the one or more database objects;
  determining, by the exchange manager, a confidence score for the secured completion;
  in response to determining the confidence score meets or exceeds a threshold value, forwarding, by the exchange manager to the secure document sharing manager, the secured completion;
  in response to determining the confidence score does not exceed a threshold value, performing, by the exchange manager, operations comprising:

generating a structured query using the unstructured questionnaire and a structured query model;
generating the secured completion based on querying one or more structured database objects of the one or more database objects using the structured query; and
forwarding, to the secure document sharing manager, the secured completion;
applying, by the secure document sharing manager, a security function to the secured completion to generate a completion of the unstructured questionnaire; and
providing, by the secure document sharing manager, the completion to the consumer.

2. The computer-implemented method of the secure computing environment of claim 1, wherein generating the secured completion by the exchange manager further comprises:
determining, by the exchange manager, that the unstructured questionnaire cannot be automatically completed by the secure computing environment; and
notifying, by the exchange manager, the provider account that the unstructured questionnaire cannot be automatically completed.

3. The computer-implemented method of the secure computing environment of claim 1,
wherein generating the secured completion by the exchange manager further comprises:
generating, by the exchange manager, the secured completion by querying metadata of one or more unstructured database objects of the one or more database objects using the structured query.

4. The computer-implemented method of the secure computing environment of claim 1,
wherein generating the secured completion by the exchange manager further comprises:
generating, by the exchange manager, a searchable model of one or more semi-structured database objects of the one or more database objects;
generating, by the exchange manager, a structured query using the unstructured questionnaire and a structured query model; and
generating, by the exchange manager, the secured completion by querying the searchable model of the one or more semi-structured database objects using the structured query.

5. The computer-implemented method of the secure computing environment of claim 4,
wherein the one or more semi-structured database objects comprise text objects, and
wherein generating, by the exchange manager, the searchable model of the one or more of the semi-structured database objects comprises:
parsing, by the exchange manager, the text objects using a natural language recognition component; and
generating, by the exchange manager, the searchable model based on the parsing.

6. The computer-implemented method of the secure computing environment of claim 1,
wherein generating the secured completion by the exchange manager further comprises:
generating, by the exchange manager, metadata for one or more unstructured database objects of the one or more database objects;
generating, by the exchange manager, a structured query using the unstructured questionnaire and a structured query model; and
generating, by the exchange manager, the secured completion by querying the metadata of the one or more unstructured database objects using the structured query.

7. The computer-implemented method of the secure computing environment of claim 6,
wherein the one or more unstructured database objects comprise video files, and
wherein generating, by the exchange manager, the metadata for the one or more unstructured database objects comprises generating captions for the video files.

8. The computer-implemented method of the secure computing environment of claim 6,
wherein the one or more unstructured database objects comprise audio files, and
wherein generating, by the exchange manager, the metadata for the one or more unstructured database objects comprises generating transcripts of the audio files.

9. A secure computing environment comprising:
at least one provider account comprising one or more database objects, the one or more database objects comprising one or more structured database objects;
a secure document sharing manager operatively coupled to an exchange manager, the secure document sharing manager configured to perform operations comprising:
receiving from a consumer, an unstructured questionnaire to be completed for the provider account;
invoking the exchange manager;
receiving, from the exchange manager, a secured completion of the unstructured questionnaire;
applying a security function to the secured completion to generate a completion of the unstructured questionnaire; and
providing the completion to the consumer; and
the exchange manager comprising a questionnaire completion model and configured to perform operations comprising:
generating the secured completion of the unstructured questionnaire using the questionnaire completion model and the unstructured questionnaire without accessing the one or more database objects of the provider account;
determining a confidence score for the secured completion;
in response to determining the confidence score meets or exceeds a threshold value, forwarding to the secure document sharing manager, the secured completion;
in response to determining the confidence score does not exceed a threshold value, performing operations comprising:
generating a structured query using the unstructured questionnaire and a structured query model;
generating the secured completion based on querying the one or more structured database objects of the one or more database objects using the structured query; and
forwarding, to the secure document sharing manager, the secured completion.

10. The secure computing environment of claim 9, wherein generating the secured completion by the exchange manager further comprises:
determining that the unstructured questionnaire cannot be automatically completed by the secure computing environment; and
notifying the provider account that the unstructured questionnaire cannot be automatically completed.

11. The secure computing environment of claim 9, wherein generating the secured completion by the exchange manager further comprises:
   generating a structured query using the unstructured questionnaire and a structured query model; and
   generating the secured completion by querying metadata of one or more unstructured database objects of the one or more database objects using the structured query.

12. The secure computing environment of claim 9, wherein generating the secured completion further comprises:
   generating a searchable model of one or more semi-structured database objects of the one or more database objects;
   generating a structured query using the unstructured questionnaire and a structured query model; and
   generating the secured completion by querying the searchable model of the one or more semi-structured database objects using the structured query.

13. The secure computing environment of claim 12, wherein the one or more semi-structured database objects comprise text objects, and
   wherein generating, by the exchange manager, the searchable model of the one or more of the semi-structured database objects comprises:
   parsing the text objects using a natural language recognition component; and
   generating the searchable model based on the parsing.

14. The secure computing environment of claim 9, wherein generating the secured completion further comprises:
   generating metadata for one or more unstructured database objects of the one or more database objects;
   generating a structured query using the unstructured questionnaire and a structured query model; and
   generating the secured completion by querying the metadata of the one or more unstructured database objects using the structured query.

15. The secure computing environment of claim 14, wherein the one or more unstructured database objects comprise video files, and
   wherein generating the metadata for the one or more unstructured database objects comprises generating captions for the video files.

16. The secure computing environment of claim 14, wherein the one or more unstructured database objects comprise audio files, and
   wherein generating the metadata for the one or more unstructured database objects comprises generating transcripts of the audio files.

17. A non-transitory computer-storage medium comprising computer-readable instructions that, when executed by a computer, cause the computer to perform operations comprising:
   receiving, by a secure document sharing manager of a secure computing environment, from a consumer, an unstructured questionnaire to be completed for a provider account storing one or more database objects in the secure computing environment;
   invoking, by the secure document sharing manager, an exchange manager of the secure computing environment;
   generating, by the exchange manager, a secured completion of the unstructured questionnaire using a questionnaire completion model and the unstructured questionnaire without accessing the one or more database objects;
   determining, by the exchange manager, a confidence score for the secured completion;
   in response to determining the confidence score meets or exceeds a threshold value, forwarding, by the exchange manager to the secure document sharing manager, the secured completion;
   in response to determining the confidence score does not exceed a threshold value, performing, by the exchange manager, operations comprising:
      generating a structured query using the unstructured questionnaire and a structured query model;
      generating the secured completion based on querying one or more structured database objects of the one or more database objects using the structured query; and
      forwarding, to the secure document sharing manager, the secured completion;
   applying, by the secure document sharing manager, a security function to the secured completion to generate a completion of the unstructured questionnaire; and
   providing, by the secure document sharing manager, the completion to the consumer.

18. The non-transitory computer-storage medium of claim 17, wherein generating the secured completion, by the exchange manager, comprises:
   determining that the unstructured questionnaire cannot be automatically completed; and
   notifying the provider account that the unstructured questionnaire cannot be automatically completed.

19. The non-transitory computer-storage medium of claim 17, wherein generating the secured completion by the exchange manager further comprises:
   generating a structured query using the unstructured questionnaire and a structured query model; and
   generating the secured completion by querying metadata of one or more unstructured database objects of the one or more database objects using the structured query.

20. The non-transitory computer-storage medium of claim 17,
   wherein generating the secured completion by the exchange manager, further comprises:
   generating a searchable model of one or more semi-structured database objects of the one or more database objects;
   generating a structured query using the unstructured questionnaire and a structured query model; and
   generating the secured completion by querying the searchable model of the one or more semi-structured database objects using the structured query.

21. The non-transitory computer-storage medium of claim 20,
   wherein the one or more semi-structured database objects comprise text objects, and
   wherein generating, by the exchange manager, the searchable model of the one or more of the semi-structured database objects comprises:
   parsing the text objects using a natural language recognition component; and
   generating the searchable model based on the parsing.

22. The non-transitory computer-storage medium of claim 17, wherein generating the secured completion by the exchange manager, further comprises:
   generating metadata for one or more unstructured database objects of the database objects;
   generating a structured query using the unstructured questionnaire and a structured query model; and generating the secured completion by querying the metadata of the one or more unstructured database objects using the structured query.

23. The non-transitory computer-storage medium of claim 22,
wherein the one or more unstructured database objects comprise video files, and
wherein generating by the exchange manager, the metadata for the one or more unstructured database objects comprises generating captions for the video files.

24. The non-transitory computer-storage medium of claim 22,
wherein the one or more unstructured database objects comprise audio files, and
wherein generating, by the exchange manager, the metadata for the one or more unstructured database objects comprises generating transcripts of the audio files.

* * * * *